INVENTORS
BENGT E. MEURK
BARTON H. NOLAND and
PATRICK JAMES DELAHANTY
BY
ATTORNEYS

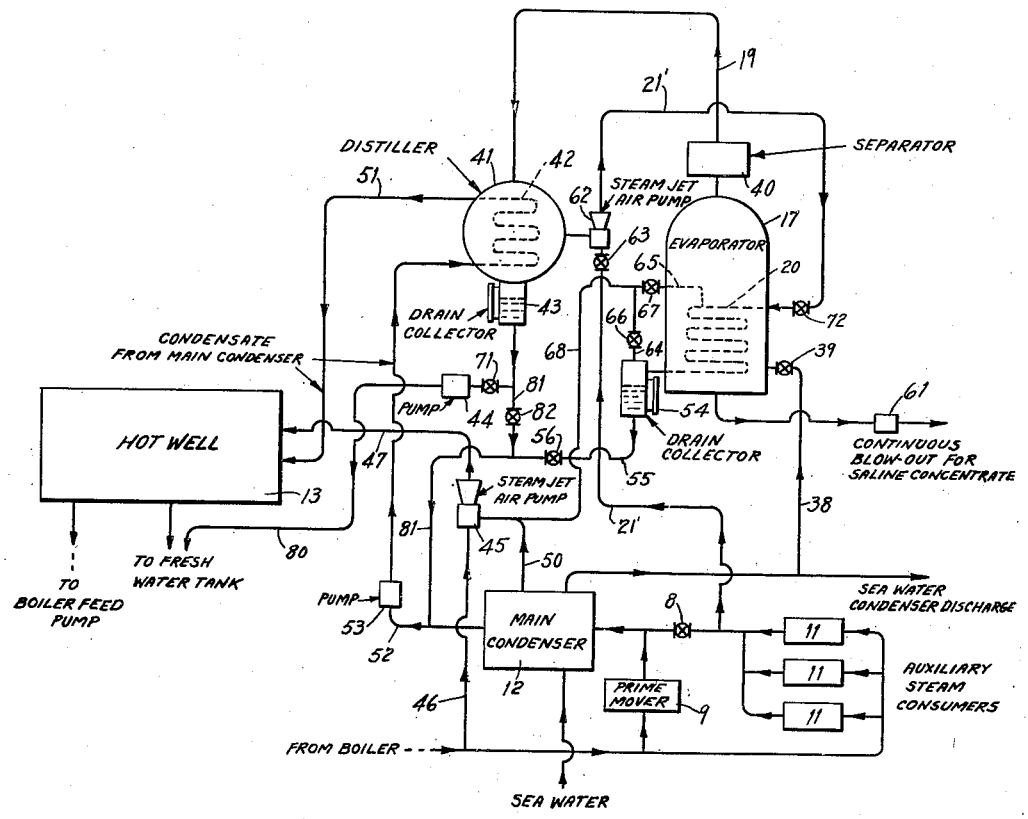

Patented Feb. 25, 1941

2,233,322

UNITED STATES PATENT OFFICE 2,233,322

STEAM PLANT INSTALLATION AND OPERATING PROCEDURE FOR DISTILLING WATER

Bengt E. Meurk, Montclair, N. J., Barton H. Noland, New York, N. Y., and Patrick James Delahanty, Cliffside Park, N. J.; said Delahanty assignor to Condenser Service & Engineering Co., Inc., Hoboken, N. J., a corporation of New Jersey Application October 27, 1939, Serial No. 301,538

3 Claims. (Cl. 122—1)

Our present invention relates generally to the operation of steam plants, and has particular reference to a novel installation and operating procedure whose primary objective is the economic production of fresh water by distillation.

The present invention is an improvement over the subject-matter of pending patent application Serial Number 241,020, filed November 17, 1938, in which there is described and illustrated an installation and operating procedure, primarily intended for a steam plant in which sea water is readily available, by means of which fresh water may be continuously produced in an unusually economical fashion.

The present invention relates to certain improvements in this general type of installation and procedure, as a result of which greater capacity is achieved, and even greater economies may be effected.

In accordance with our invention, sea water is introduced into an evaporator, and distilled in such a manner that the latent heat of the fresh water vapor is conserved and restored to the steam plant system. Preferably warmed sea water is utilized, and the sea water discharged from the steam condensing apparatus of the system has been found to be a desirable source of warmed sea water. Also, the operation of the evaporator is preferably carried out by means of heat which is drawn from the system itself.

Our present improved method and installation provide for the operation of the evaporator under sub-atmospheric conditions, preferably under a vacuum which may be as high as twenty-eight inches of mercury. This not only facilitates and speeds up the rate of evaporation, but requires less heat; and permits other economies to be effected by virtue of the fact that the apparatus, particularly the evaporator, need not be heat-insulated, and by virtue of the fact that the low temperature in the evaporator precludes the formation of saline cake or scale on the heating coils and other interior portions of the evaporator.

The evaporation of liquids under a vacuum is not broadly new, but so far as we are aware, no prior attempts have ever been made to evaporate sea water under sub-atmospheric conditions while, at the same time, conserving the latent heat of the fresh water vapor.

A further feature of our present improvement lies in the utilization of the condensate from the main condenser of the steam plant installation as a cooling or distilling medium for the fresh water vapor emanating from the evaporator.

These and other features of the present invention contribute to the accomplishment of the general objective to produce fresh water in useful quantities, at unusually low cost, and largely by the use of existing equipment in steam plant installations.

While our invention is broadly applicable to all sorts of industrial plants, wherever the distilling of water is or can be resorted to, it is particularly valuable for marine plants, and tests have shown that our present installation and procedure can be employed in plants of this character with practically no extra cost whatsoever.

We accomplish these general objects and advantages, and such other objects as may hereinafter appear or be pointed out, in the manner illustratively exemplified in the accompanying drawings in which:

Figure 2 is a fragmentary flow sheet showing a modification; and

Figure 1:
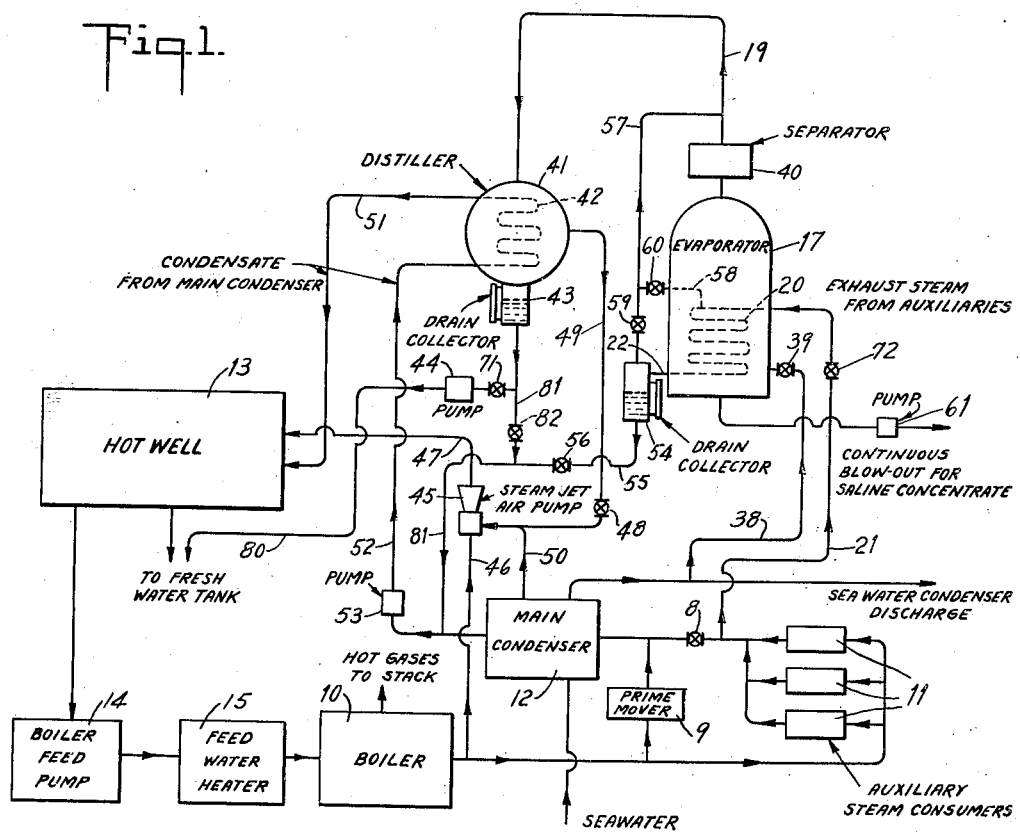
Figure 1 is a flow sheet of the essential elements of a typical steam plant installation of the present improved character using a small surface condenser for distilling the vapor from the evaporator.

In Figure 1 we have included a showing of the conventional circulatory system which comprises the steam generating apparatus or boiler 10, the steam-utilizing apparatus consisting generally of the prime mover 9 and auxiliary steam consumers 11, and the steam condensing apparatus 12. The live steam from the boiler 10 is conducted directly to the prime mover 9 and the auxiliary steam consumers 11, and the latter term is intended to include steam radiators, laundries, or other apparatus which utilizes steam from the boiler. The exhausts from the steam consumers lead ultimately to the condenser 12, the cooling medium of which is sea water which passes through the condenser, and which becomes heated to a temperature between 85° and 105° F. in performing its condensing function. This warmed sea water is discharged overboard and constitutes one of the two major elements of what are nowadays considered inevitable heat losses. The other major heat loss takes place through the hot gases leaving the boiler and escaping through the stack.

The condensate from the condenser 12 is ultimately conducted to the feed and filter tank, or hot well 13 which, it will be understood, is the usual open tank open to atmospheric pressure; and from the hot well the water is returned to the boiler through the usual boiler feed system including, for example, the boiler feed pump 14 and the feed water heater 15.

Water is also drawn off when necessary from the hot well or from the line 80 to the fresh water tank which serves as a reservoir for the water used for domestic purposes, i. e., for washing, cleaning, etc.

In accordance with our present invention sea water is conducted into an evaporator 17. Preferably, this sea water is drawn from the warmed circulating water discharged from any convenient heat exchanger; and we have found it to be of particular advantage to draw this sea water from the circulating water discharge from the condenser. Any suitable means may be provided for introducing this sea water into the evaporator 17, and by virtue of the sub-atmospheric pressure in the evaporator 17, as hereinafter to be described, the introduction of the sea water presents no difficulty. We have therefore shown merely a conduit 38 and a valve 39.

The fresh water vapor emanating from the evaporator 17 passes through a separator 40 by means of which unevaporated particles of sea water are prevented from travelling further through the conduit 19. In place of the separator, any commercial dryer or equivalent device may be employed.

In the installation of Figure 1, the conduit 19 conducts the fresh water vapor into a distiller 41 shown in the form of a small surface condenser in which there is a coil 42, or its equivalent, such as a nest of tubes, through which a cooling medium passes. The condensed fresh water accumulates in the drain collector 43. From here it may be conducted, as desired, either to the fresh water tank (by means of line 80, valve 71, and pump 44), or to the hot well (by means of line 81, valve 82, and pump 53).

A vacuum is maintained in the distiller 41 by means of the steam jet air pump 45. Any convenient vacuum-producing device may be employed, but in the illustrated case the so-called "radojet" indicated in Figure 1 is used. The steam which actuates this jet enters it through the conduit 46, and leaves through the conduit 47, the latter leading into the water in the hot well 13.

We prefer to provide a valve 48 in the conduit 49 leading from the distiller 41 to the pump 45. This valve enables us to control the degree of vacuum in the distiller 41.

We have also shown a communication 50 between the pump 45 and the main condenser 12, whereby the desired vacuum of approximately twenty-eight inches of mercury is maintained within the condenser 12.

In accordance with one novel feature of our present invention, the cooling medium passing through the coils 42 in the distiller 41 is ultimately conducted through a conduit 51 into the hot well 13. In this way, the latent heat of the fresh water vapor is conserved and transferred back into the steam plant by way of the hot well 13. Any rise in the temperature of the water in the hot well 13, as a result of this restoration of heat into the system, reduces the amount of work which the feed water heater 15 has to do.

A further feature of our present invention lies in utilizing the condensate from the main condenser 12 as the cooling medium for the distiller 41. We have illustratively shown a conduit 52 through which, with the aid of a pump 53, the condensate from the condenser 12 is conducted into and through the coils 42. This condensate usually has a temperature of about 90° F., and is thus adequate to effect the desired condensing action upon the fresh water vapor, which has a temperature of approximately 135° F.

The evaporator 17 is operated by means of heat drawn from the steam plant itself, and in Figure 1 we have shown one way in which this can be accomplished. A back pressure valve 8, or equivalent instrumentality, is preferably arranged in the exhaust steam line, and a conduit 21 leads from this line to a coil 20 in the evaporator. A coil valve 72 in the conduit 21 permits a control of the pressure in the coil 20. This pressure is usually kept at a vacuum between zero and about twelve inches of mercury when the vapor pressure in the evaporator 17 is at a vacuum of about twenty-five inches of mercury. There is thus fed into the coil 20 a heating medium which we have designated "exhaust steam from auxiliaries." By this term we intend to refer not only to the low pressure exhaust steam leaving steam consumers other than the prime mover 9, but also to other sources of waste steam. This heating medium, whatever its source may be, leaves the evaporator through a pipe 22 which leads into the drain collector 54. A conduit 55, preferably with a valve 56 in it, leads this condensate into the line 81 through which it ultimately returns to the hot well.

The drain collector 54 is preferably vented, as shown at 57, to the conduit 19; and the coil 20 itself is similarly vented as indicated at 58. Valves 59 and 60 may control these vents.

The unusual efficiency of our invention is based on the fact that the major portion of the heat entering the evaporator through the pipe 21 is conserved. Whatever heat may be given up by the steam in producing fresh water vapor in the conduit 19, is restored to the system in the hot well 13. Similarly, the latent heat of the vapor in the conduit 19 is absorbed by the cooling medium in the distiller 41, and is restored to the system in the hot well 13. The only heat which is definitely lost is that which is carried away by the saline concentrate, and this is a negligible amount.

The saline concentrate may be disposed of by means of a continuous blow off, or by means of an intermittent blow off. We have illustratively shown a pump 61 which eliminates the saline concentrate in a continuous manner. Disadvantages arising from an undesirable formation of scale, and the consequent necessity for frequent interruption and cleaning, are avoided by maintaining a low saline concentration, and also by the low temperature of the steam used in the heating coils, and the corresponding low temperature in the evaporator 17.

In Figure 2 we have shown a modification in which there are two steam jet air pumps. The steam jet air pump 45 is the same as that shown in Figure 1, creating the desired vacuum in the main condenser 12. A separate steam jet air pump 62 is provided, however, for the distiller 41. This jet utilizes the exhaust steam traveling through the conduit 21' on its way to the heating coil 20. A valve 63 is preferably arranged in the conduit 21'.

The advantage of this arrangement is that it reduces the temperature of the steam in the coil 20, and also reduces by a slight amount the quantity of steam needed to operate the pump 45. A further advantage arises from the fact that it is a characteristic of a steam jet air pump that the steam leaving the mouth of the nozzle is always saturated and never superheated. Accordingly, by using the pump 62 as shown in Figure 2, there is an assurance that the steam entering the coil 20, or its equivalent, is never in the superheated range of temperature which might have a bad effect by inducing undesirable scale formation on the outside of the coil 20.

In the embodiment of Figure 2, the drain collector 54 is vented as at 64, and the coil 20 is vented as at 65. These vents are controlled by the valves 66 and 67, respectively, and communicate through the conduit 68 with the vacuum side of the condenser 12. The valve 67 is adjusted to avoid any short-circuiting of the steam flow through the coil 20.

In other respects, the flow sheet of Figure 2 is the same as that shown in Figure 1, and wherever these flow sheets are identical the same reference numerals have been applied, for the sake of clearness.

Figure 3:
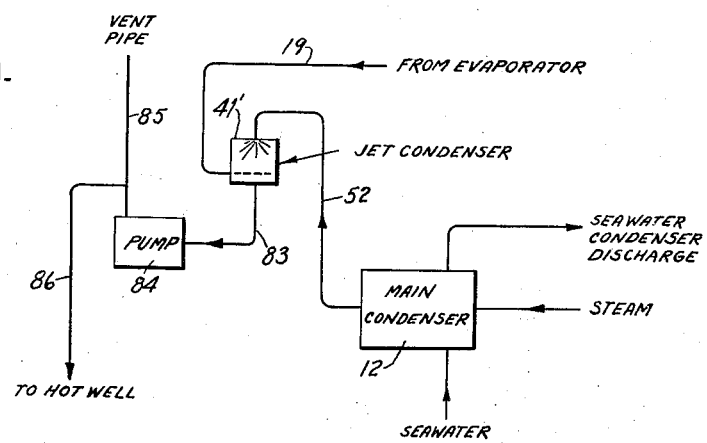
Figure 3 is a fragmentary flow sheet showing a further modification.

In Figure 3, we have shown a modification which is preferred where the prime-mover of the steam plant is a reciprocating engine. The condensate from the main condenser 12 is in this case used as a condensing medium for the fresh water vapor by introducing it into the distiller 41' in the form of a jet, or, in other words, the distiller 41' is constructed in the form of a jet condenser instead of a surface condenser. This jet condenser, in actual practice, is located directly underneath the condenser 12. The fresh water vapor emanating from the evaporator through the pipe 19 is led into this distiller below the jet, in a suitable manner which prevents the vapor from backing into the condenser 12 and which subjects it to the condensing action of the jet.

The resulting condensate is drawn from the distiller 41' through a pipe 83, and conveyed to the hot well by means of a pump 84, preferably a displacement air and condensate pump of the "Edwards" type, direct-connected with the prime-mover through a walking beam. The pipe 85 serves as an accumulator and as a vent, and from it the pipe 86 leads to the hot well.

This installation requires no separate means for maintaining a vacuum in the distiller, and hence in the evaporator. The operation of the jet maintains a vacuum in the distiller 41' which is practically the same as the vacuum in the main condenser. And, as before, all the latent heat of the fresh water vapor is conserved.

In other respects, the flow sheet of Figure 3 may be the same as that shown in Figure 1, and wherever these flow sheets are identical the same reference numerals have been applied, for the sake of clearness. Minor auxiliary equipment, such as a drain collector, and valves, has been omitted from Figure 3.

In general, in the accompanying drawings, it will be understood that valves, pumps, and other minor accessories and fittings, have been omitted except where their use is especially desirable. It will be understood, however, that such accessories may be arranged wherever their presence may be deemed to be expedient.

As in the case of the invention described in our copending application, the present improvements are not necessarily restricted to marine work, and the term "sea water" as used in the appended claims is intended to include within its scope any water or liquid whose distillation results in producing fresh water for the steam plant.

It should also be understood that the evaporator shown in Figures 1 and 2, is a so-called "single-effect" evaporator. It might be readily replaced, however, without material departure from the essential features of the invention, by a series of "multiple-effect" evaporators. Such a series is known, per se, and consists, for example, of two evaporators in tandem, the first being heated by a coil 20 (as in Figure 1 or 2), the second being heated by the fresh water vapor emanating from the first.

In general, it will be understood that changes in the details, herein described and illustrated for the purpose of explaining the nature of our invention, may be made by those skilled in the art without departing from the spirit and scope of the invention as expressed in the appended claims. It is, therefore, intended that these details be interpreted as illustrative, and not in a limiting sense.

Having thus described our invention, and illustrated its use, what we claim as new and desire to secure by Letters Patent is:

1. In a steam plant, a boiler, steam-utilizing apparatus including steam-using auxiliaries connected to utilize the steam generated by said boiler, a condenser connected to condense the exhaust steam discharged from said steam-utilizing apparatus, a hot well arranged to accumulate at atmospheric pressure the condensate from said condenser, means for feeding said condensate from said hot well to said boiler, an evaporator, means for feeding sea water to the evaporator, means for heating the water in the evaporator by means of exhaust steam from said auxiliaries, a distiller into which the fresh water vapor emanating from the evaporator is conducted, means for maintaining a vacuum in said distiller and hence in said evaporator, and means for conducting the condensate from said condenser into said distiller and thence into the hot well, said condensate serving in the distiller as a condensing medium for said fresh water vapor, the latent heat of the latter being thereby transferred to the hot well.

2. In a steam plant, the combination set forth in claim 1, said vacuum-maintaining means comprising a steam jet pump, and means for operating said pump by the exhaust steam on its way from said auxiliaries to said evaporator.

3. In a steam plant, the combination set forth in claim 1, the last-named means being adapted to conduct the condensate into said distiller in the form of a jet which encounters and condenses the fresh water vapor.

BENGT E. MEURK.
          BARTON H. NOLAND.
          P. JAMES DELAHANTY.